UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

MANUFACTURE OF BARIUM ALUMINATE AND SULFUR.

1,240,571.     Specification of Letters Patent.     Patented Sept. 18, 1917.

No Drawing.     Application filed October 21, 1916. Serial No. 126,998.

*To all whom it may concern:*

Be it known that I, PAUL R. HERSHMAN, a subject of the Empire of Austria-Hungary, residing at Chicago, county of Cook, State of Illinois, have invented certain new and useful Improvements in the Manufacture of Barium Aluminate and Sulfur; and I do hereby declare the following to be a full, clear, and exact description of the invention, such as will enable others skilled in the art to which it appertains to make and use the same.

The present invention relates to the treatment of natural barium compounds and natural (ferruginous) alumina for the production of barium aluminate—a product readily soluble in hot water and having considerable value in the arts. For instance, the alumina recoverable from barium aluminate, by partial neutralization with acids, is much more easily obtained in pure form than that from the corresponding aluminate of sodium. So also, the invention presents a ready means for obtaining pure barium salts, and milk of sulfur is obtained as a by-product.

When barium sulfate is reduced by carbon alone without the addition of alumina the reduction hardly goes beyond the production of sulfid. But even if alumina is added, in addition to the carbon used, the amount of sulfids produced in the process of reduction remains very high. By carrying out the invention in the manner described below the amount of sulfids obtained is reduced to a minimum, and most of the alumina employed and of the barium oxid produced by the reduction are converted into water-soluble barium aluminate.

In carrying out the invention, a natural reducible barium compound (for instance, barytes) is mixed with crude alumina and an amount of carbon in excess of that necessary for the reduction of barium sulfate to barium sulfid. The mixture should preferably be crushed, ground, or otherwise reduced to a fineness of at least 100 mesh, and is then heated for about four hours at a temperature of 1000° to 1100° C., in an externally heated muffle. A slow current of reducing gas (for instance generator gas) and steam is passed simultaneously over and through the mixture. The presence of steam passed simultaneously with the reducing gas through the muffle seems to be of particular assistance in the reduction of the sulfate and the subsequent formation of the aluminate, probably by reason of the reducing action of the carbon monoxid and hydrogen formed by the action of the steam on the carbon contained in the charge itself. Instead of using a large excess of carbon for this purpose a smaller amount can be employed and the heating be carried out first in the presence of reducing gas only, and then of reducing gas assisted by steam, but at a sacrifice of the yield of barium aluminate.

The amount of carbon present in the mixture must be sufficiently high to permit a certain amount of the carbon to be still present in the mass at the end of the operation. If this is not the case, part of the barium aluminate formed is again decomposed, possibly by the carbon dioxid contained in the gases. If a surplus of carbon is present, this danger is guarded against, inasmuch as any carbon dioxid which tends to form is immediately reduced to carbon monoxid.

During the operation, elemental sulfur is driven off and can be collected as such in a suitable condenser, or can be collected as milk of sulfur by spraying in the ordinary manner. According to the proportion of barytes ($BaSO_4$) used there is formed either the compound $Al_2O_3.BaO$ or the compound higher in barium content, $Al_2O_3.2BaO$.

Having thus described my invention, what I claim is:

1. The method of producing barium aluminate, which consists of heating a reducible barium compound, alumina, and an excess of carbon, in an atmosphere of reducing gas; substantially as described.

2. The method of producing barium aluminate, which consists of heating a reducible barium compound, alumina, and an excess of carbon, in an atmosphere of reducing gas together with steam; substantially as described.

3. The process of producing barium aluminate and sulfur, by heating barium sulfate, alumina, and an excess of carbon, in an atmosphere of reducing gas; substantially as described.

4. The process of producing barium aluminate and sulfur, by heating barium sulfate, alumina, and an excess of carbon, in an atmosphere of reducing gas, together with steam; substantially as described.

In testimony whereof I affix my signature.

PAUL RALPH HERSHMAN.